US006732942B1

United States Patent
Sangwan et al.

(10) Patent No.: US 6,732,942 B1
(45) Date of Patent: May 11, 2004

(54) HEATING, VENTING, AND AIR CONDITIONING SYSTEM FOR PROVIDING SUPPLEMENTAL HEAT IN A VEHICLE

(75) Inventors: Karma Vir Sangwan, East Amherst, NY (US); Thomas Martin Urbank, Lockport, NY (US); Malcolm James Grieve, Fairport, NY (US); John E. Kirwan, Troy, MI (US); John F. O'Brien, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 8 days.

(21) Appl. No.: 10/299,344

(22) Filed: Nov. 19, 2002

(51) Int. Cl.[7] .................................................. B60H 1/02
(52) U.S. Cl. ........................ 237/12.3 B; 237/12.3 R; 123/142.5 E; 165/41; 165/42
(58) Field of Search ................... 237/12.3 R, 12.3 B; 123/142.5 E; 165/41, 42

(56) References Cited

U.S. PATENT DOCUMENTS

| | | | |
|---|---|---|---|
| 5,248,566 A | * | 9/1993 | Kumar et al. .................. 429/19 |
| 5,409,784 A | * | 4/1995 | Bromberg et al. ............. 429/13 |
| 5,662,184 A | * | 9/1997 | Riemer et al. .............. 180/65.1 |
| 6,210,821 B1 | * | 4/2001 | Lesieur et al. ................. 429/17 |
| 6,223,843 B1 | * | 5/2001 | O'Connell et al. ......... 180/65.3 |
| 6,443,253 B1 | * | 9/2002 | Whitehead et al. ......... 180/68.1 |
| 6,448,535 B1 | * | 9/2002 | Ap .............................. 219/208 |
| 6,555,928 B1 | * | 4/2003 | Mizuno et al. ........... 290/40 C |

\* cited by examiner

*Primary Examiner*—Derek Boles
(74) *Attorney, Agent, or Firm*—Patrick M. Griffin (57) ABSTRACT

A heating, venting, and air conditioning system utilizes a reformer to provide supplemental heat to a passenger compartment and to improve start-up emissions of an engine of a vehicle or power system. A pump circulates a fluid through the engine and throughout the system. A radiator and heater core transfer heat from the fluid. A first circuit cools the fluid upon circulation through the radiator after circulation through the engine to cool the engine, and a second circuit heats the passenger compartment and cools the fluid upon circulation through the heater core after circulation through the engine to cool the engine. The reformer, which converts a hydrocarbon or alcohol fuel into a reformate, generates heat. A third circuit, defined between the reformer and the pump and interconnected with the heater core, provides the supplemental heat from the reformer to the passenger compartment through the heater core and also to the engine.

9 Claims, 11 Drawing Sheets

HEATING, VENTING, AND AIR CONDITIONING SYSTEM FOR PROVIDING SUPPLEMENTAL HEAT IN A VEHICLE

TECHNICAL FIELD

The subject invention generally relates to a heating, venting, and air conditioning (HVAC) system for a vehicle or power system. The subject invention also relates to a powertrain cooling (PTC) system for a vehicle or power system and also to an emission control system of an internal combustion engine. The HVAC system provides supplemental heat to a passenger compartment and to an engine of the vehicle, and the PTC system provides necessary cooling of various powertrain components, such as the engine and the transmission.

BACKGROUND OF THE INVENTION

HVAC systems are known in the art. A prior art HVAC system is generally disclosed in FIG. 1 at 10. HVAC systems are used to heat and cool a passenger compartment of a motor vehicle and also to cool an engine 12 of the vehicle during operation. The HVAC system 10 disclosed in FIG. 1, and other conventional HVAC systems, include a first heat exchanger 14, or radiator, a second heat exchanger 16, or heater core, and a pump 18. Conventional HVAC systems 10 also include a first fluid circuit 15 between the pump 18 and the first heat exchanger 14, and a second fluid circuit 17 between the pump 18 and the second heat exchanger 16.

Figure 1:
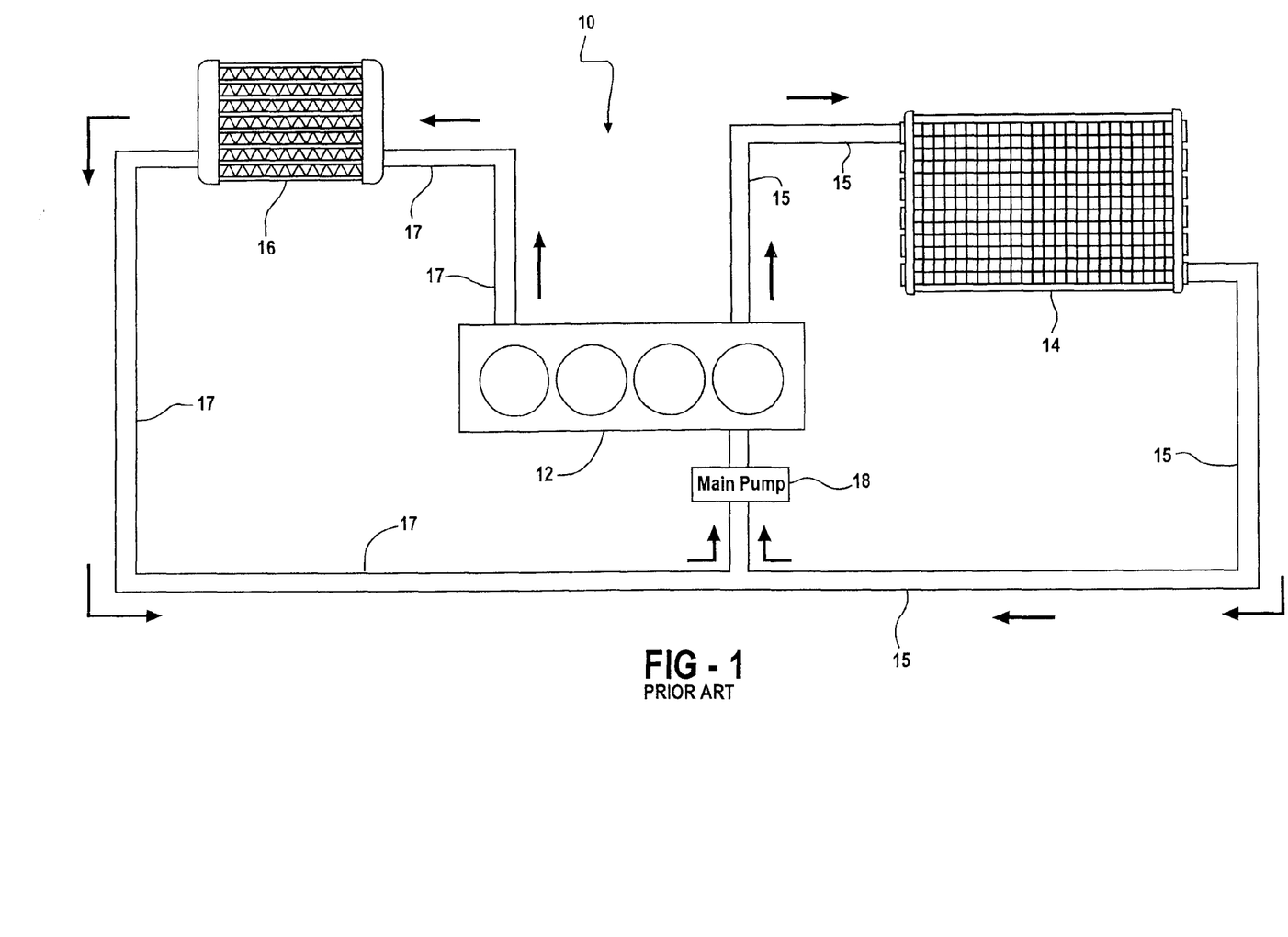
FIG. 1 is a schematic view of a prior art heating, venting, and air conditioning system (HVAC) for a vehicle including a first heat exchanger, or radiator, a second heat exchanger, or heater core, and a pump.

To cool the engine, the pump 18, which is typically a mechanical, belt-driven pump that is operatively connected to a crankshaft of the engine 12, circulates a fluid from the pump 18, through the engine 12, into the radiator 14, and back to the pump 18. When the heater core 16 is utilized to heat the passenger compartment, the fluid from the engine 12 circulates through the heater core 16 and back to the pump 18.

It is known throughout the art that, during the start-up of a cold engine, it takes a significant amount of time for the passenger compartment of the vehicle to warm-up, which causes discomfort for any occupants of the vehicle. This prolonged amount of time also prevents faster defrosting of the windshield of the vehicle. Furthermore, as engines continue to be redesigned to improve their efficiency, the amount of time necessary for the fluid to warm-up is increasing. This also contributes to the discomfort of the vehicle occupants and prolonged defrosting of the windshield. The HVAC systems 10 of the prior art do not adequately resolve this occupant discomfort. The HVAC systems 10 of the prior art are also unable to quickly defrost the windshield.

As a result, it is desirable to provide supplemental heat to the passenger compartment of the vehicle. More specifically, due to the inadequacies of the prior art HVAC systems, including those described above, it is desirable to provide an HVAC system that utilizes heat that is generated in a reformer to provide supplemental heat to the passenger compartment and also to the engine of the vehicle.

SUMMARY OF THE INVENTION

A heating, venting, and air conditioning (HVAC) system for use in a vehicle is disclosed. The HVAC system provides supplemental heat in a vehicle, specifically to a passenger compartment and to an engine of the vehicle. The HVAC system of the subject invention includes at least one pump, and first and second heat exchangers. The pump circulates a fluid through the engine and throughout the system. The first and second heat exchangers are in fluid communication with the pump for transferring heat from the fluid.

The HVAC system also includes a first fluid circuit and a second fluid circuit. The first fluid circuit is defined between the first heat exchanger and the pump. As such, the first fluid circuit cools the fluid upon circulation of the fluid through the first heat exchanger after the fluid circulates through the engine to cool the engine. The second fluid circuit is defined between the second heat exchanger and the pump. As such, the second fluid circuit heats the passenger compartment of the vehicle. The second fluid circuit also cools the fluid upon circulation of the fluid through the second heat exchanger after the fluid circulates through the engine to cool the engine.

The HVAC system of the subject invention also includes a reformer assembly. The reformer assembly converts a hydrocarbon or alcohol fuel of the vehicle into a hydrogen-containing reformate. The reformer assembly generates heat upon the conversion of the fuel into the reformate. Like the first and second heat exchangers, the reformer assembly is also in fluid communication with the pump.

A third fluid circuit is defined between the reformer assembly and the pump. This third fluid circuit is interconnected with the second heat exchanger. As such, the third fluid circuit provides supplemental heat to the passenger compartment through the second heat exchanger due to the heat that is generated in the reformer assembly upon the conversion of the fuel into the reformate. This third fluid circuit also provides supplemental heat to the engine due to the heat that is generated in the reformer assembly upon the conversion.

Accordingly, the subject invention provides a HVAC system for a vehicle that utilizes heat generated in a reformer assembly to supply heat in the vehicle. Specifically, the HVAC system of the subject invention provides supplemental heat to a passenger compartment of the vehicle thereby increasing the comfort of any occupants of the vehicle. The HVAC system of the subject invention also provides reformate and supplemental heat to an engine and/or an exhaust catalyst of the vehicle thereby improving the emission performance of the vehicle, improving durability of the engine by reducing friction of engine components, and improving fuel economy.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Referring to the Figures, wherein like numerals indicate like or corresponding parts throughout the several views, a heating, venting, and air conditioning (HVAC) system is generally disclosed at 20. The HVAC system 20 provides supplemental heat in a vehicle. More specifically, the HVAC system 20 of the subject invention provides supplemental heat to a passenger compartment and also to an engine 22 of the vehicle. In addition to the passenger compartment and the engine 22, the vehicle also include an intake manifold 23 and a catalytic converter 25. The intake manifold 23 and the catalytic converter 25 are represented schematically in FIG. 7.

The HVAC system 20 includes at least one pump 24, a first heat exchanger 26, a second heat exchanger 28, a reformer assembly 30, and first 32, second 34, and third 36 fluid circuits. As understood by those skilled in the art, the first heat exchanger 26 is commonly referred to as a radiator 26, and the second heat exchanger 28 is commonly referred to as a heater core 28. Accordingly, for descriptive purposes only, the first heat exchanger 26 is hereinafter referred to as the radiator 26, and the second heat exchanger 28 is hereinafter referred to as the heater core 28. The radiator 26 and the heater core 28 are in fluid communication with the pump 24 to transfer heat from a fluid circulated by the pump 24.

The pump 24 includes a pump inlet and a pump outlet, and the engine 22 includes an engine fluid inlet 38 and first and second engine fluid outlets 40, 42. Although the pump inlet and pump outlet of the pump 24 are disclosed in the Figures, these components are not numbered for clarification purposes in the Figures. The second engine fluid outlet 42 is interconnected with both the second and third fluid circuits 34, 36 as described below. The pump outlet is in fluid communication with the engine fluid inlet 38 to circulate fluid into and through the engine 22, and the first and second engine fluid outlets 40, 42 are in fluid communication, indirectly, with the pump inlet through the radiator 26, the heater core 28, and the reformer assembly 30 for receiving the fluid that has been circulated through the engine 22.

The radiator 26 includes a fluid inlet and outlet, the heater core 28 includes a fluid inlet and outlet, and the reformer assembly 30 includes a fluid inlet and outlet. All of these fluid inlets and outlets are represented schematically throughout the Figures and have not been numbered in the Figures for clarification purposes. The pump 24 circulates the fluid through the engine 22 and throughout the HVAC system 20. The pump inlet receives the fluid after the fluid has been circulated through the engine 22, and the pump outlet circulates the fluid through the engine 22 and throughout the HVAC system 20. Relative to the radiator 26, the pump inlet is in fluid communication with the fluid outlet of the radiator 26 and the pump outlet is in fluid communication with the fluid inlet of the radiator 26 after the fluid circulates through the engine 22. Relative to the heater core 28, the pump inlet is also in fluid communication with the fluid outlet of the heater core 28 and the pump outlet is in fluid communication with the fluid inlet of the heater core 28 after the fluid circulates through the engine 22. Relative to the reformer assembly 30, the pump inlet is in fluid communication with the fluid outlet of the reformer assembly 30 and the pump outlet is in fluid communication with the fluid inlet of the reformer assembly 30 after the fluid circulates through the engine 22.

Although not required, in the preferred embodiment of the subject invention, the at least one pump 24 is further defined as a main pump 44 and an auxiliary pump 46. In this preferred embodiment, the main pump 44 circulates the fluid through the engine 22 and throughout the first and second fluid circuits 32, 34, and the auxiliary pump 46 circulates the fluid throughout the third fluid circuit 36 into the heater core 28. In embodiments where two pumps, the main pump 44 and the auxiliary pump 46, are utilized, the main pump 44 can be a mechanical pump and the auxiliary pump 46 can be an electric pump. Alternatively, in these embodiments, the main pump 44 can be an electric pump and auxiliary pump 46 can also be a separate electric pump. However, as described above, it is not necessary that there be two pumps in the HVAC system 20 of the subject invention. For instance, if the main pump 44 is an electric pump then an auxiliary pump 46 is not required. In such an alternative embodiment, the main pump 44, which is an electric pump, circulates the fluid through the engine 22 and throughout the first and second fluid circuits 32, 34 and also circulates the fluid throughout the third fluid circuit 36 and to the heater core 28.

The HVAC system 20 also includes the first fluid circuit 32 and the second fluid circuit 34. The first fluid circuit 32 is defined between the radiator 26 and the pump 24. The first fluid circuit 32 is more specifically defined between the pump outlet, through the engine fluid inlet 38, through the engine 22 itself, through the first engine fluid outlet 40, through the fluid inlet of the radiator 26, through the radiator 26 itself, through the fluid outlet of the radiator 26, and to the pump inlet. As such, the first fluid circuit 32 cools the fluid upon circulation of the fluid through the radiator 26 after the fluid has circulated through the engine 22 to cool the engine 22.

On the other hand, the second fluid circuit 34 is defined between the heater core 28 and the pump 24. The second fluid circuit 34 is more specifically defined between the pump outlet, through the engine fluid inlet 38, through the engine 22 itself, through the second engine fluid outlet 42, through the fluid inlet of the heater core 28, through the heater core 28 itself, through the fluid outlet of the heater core 28, and to the pump inlet. As such, the second fluid circuit 34 heats the passenger compartment of the vehicle. The second fluid circuit 34 also cools the fluid upon circulation of the fluid through the heater core 28 after the fluid circulates through the engine 22 to cool the engine 22.

The HVAC system 20 of the subject invention also includes the reformer assembly 30, which is in fluid communication with the pump 24, and the third fluid circuit 36. The reformer assembly 30 enables low vehicle emissions with internal combustion engines by converting the hydrocarbon (HC) fuel, i.e., gasoline, or alcohol fuel of the vehicle into a hydrogen-containing reformate. For example, the hydrogen-containing reformate is used to reduce $NO_x$ levels during the start-up of a cold engine due to the low flammability limit of hydrogen.

The reformer assembly 30 combines the hydrocarbon fuel or the alcohol fuel for the vehicle with an oxidant, such as air or exhaust gases, under highly fuel-rich conditions in a partial oxidation reaction that can be schematically represented as:

$$Fuel + Air \rightarrow H_2 + CO + N_2 + Heat + (CO_2, H_2O, HCs)$$

In this reaction, hydrogen atoms are split from carbon atoms. As the above schematic representation discloses, the reformer assembly 30 generates heat upon the conversion of the fuel into the reformate.

The reformate has very wide combustion limits to enable gasoline-fueled, spark-ignition engine operation under very dilute conditions such as ultra-lean conditions or conditions with heavy exhaust gas recirculation concentrations. The reformer assembly 30 utilized in the subject invention is advantageous in that it provides robustness for vehicles that are heavier than normal. The reformer assembly 30 provides robustness for vehicles with larger engines and provides robustness under off cycle conditions such as low ambient temperatures, i.e., cold start-ups. The reformer assembly 30 provides a robustness to low volatility fuel (this is known throughout the industry as high Driveability Index (DI) fuel), and the reformer assembly 30 is also compatible with automotive fuel cell systems. The reformer assembly 30 is described additionally below.

The third fluid circuit 36 strategically utilizes the heat generated in the reformer assembly 30. To accomplish this, the third fluid circuit 36 is defined between the reformer assembly 30 and the pump 24 and is interconnected with the heater core 28. More specifically, the third fluid circuit 36 is defined between the pump outlet, through the engine fluid inlet 38, through the engine 22 itself, through the second engine fluid outlet 42, through the fluid inlet of the reformer assembly 30, through the reformer assembly 30 itself, through the fluid outlet of the reformer assembly 30, and to the pump inlet. As a result, as disclosed in FIGS. 2A and 3A, the third fluid circuit 36 is able to provide the supplemental heat to the passenger compartment through the heater core 28 due to the heat that is generated in the reformer assembly 30 upon conversion of the fuel into the reformate. Also as a result, as disclosed in FIGS. 2B, 2C, 3B, and 3C, the third fluid circuit 36 is able to provide the supplemental heat, from the reformer assembly 30, to the engine 22 of the vehicle due to the heat that is generated in the reformer assembly 30 upon the conversion.

The third fluid circuit 36 includes a first fluid return 48 to the pump inlet and a second fluid return 50 to the pump inlet. The first fluid return 48 of the third fluid circuit 36 interconnects the fluid outlet of the reformer assembly 30 and the fluid inlet of the heater core 28. As such, as disclosed in FIGS. 2A and 3A, the first fluid return 48 provides the supplemental heat to the passenger compartment through the heater core 28 due to the heat that is generated in the reformer assembly 30 upon the conversion of the fuel into the reformate.

On the other hand, the second fluid return 50 of the third fluid circuit 36 is isolated from the heater core 28 and instead interconnects the fluid outlet of the reformer assembly 30 and the pump inlet. More specifically, the second fluid return 50 interconnects the fluid outlet of the reformer assembly 30 with the engine fluid inlet 38 through the pump 24. As such, as disclosed in FIGS. 2B, 2C, 3B, and 3C, the second fluid return 50 provides the supplemental heat to the engine 22 due to the heat that is generated upon the conversion.

Figure 2A:
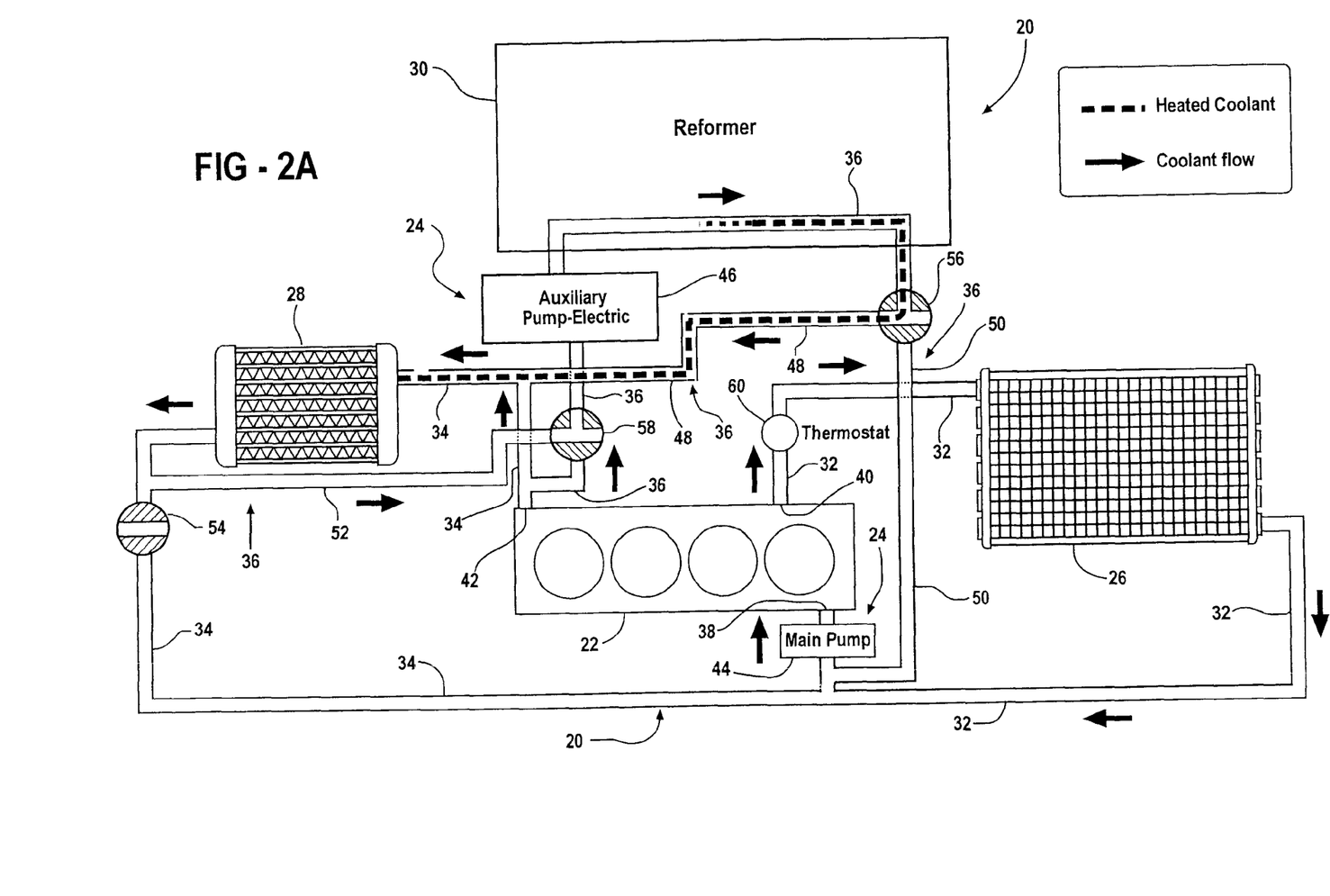
FIG. 2A is a schematic view of a HVAC system of the subject invention including the first heat exchanger, the second heat exchanger, the pump, and a reformer assembly and illustrating a configuration for providing supplemental heat to a passenger compartment of the vehicle.
Figure 2B:
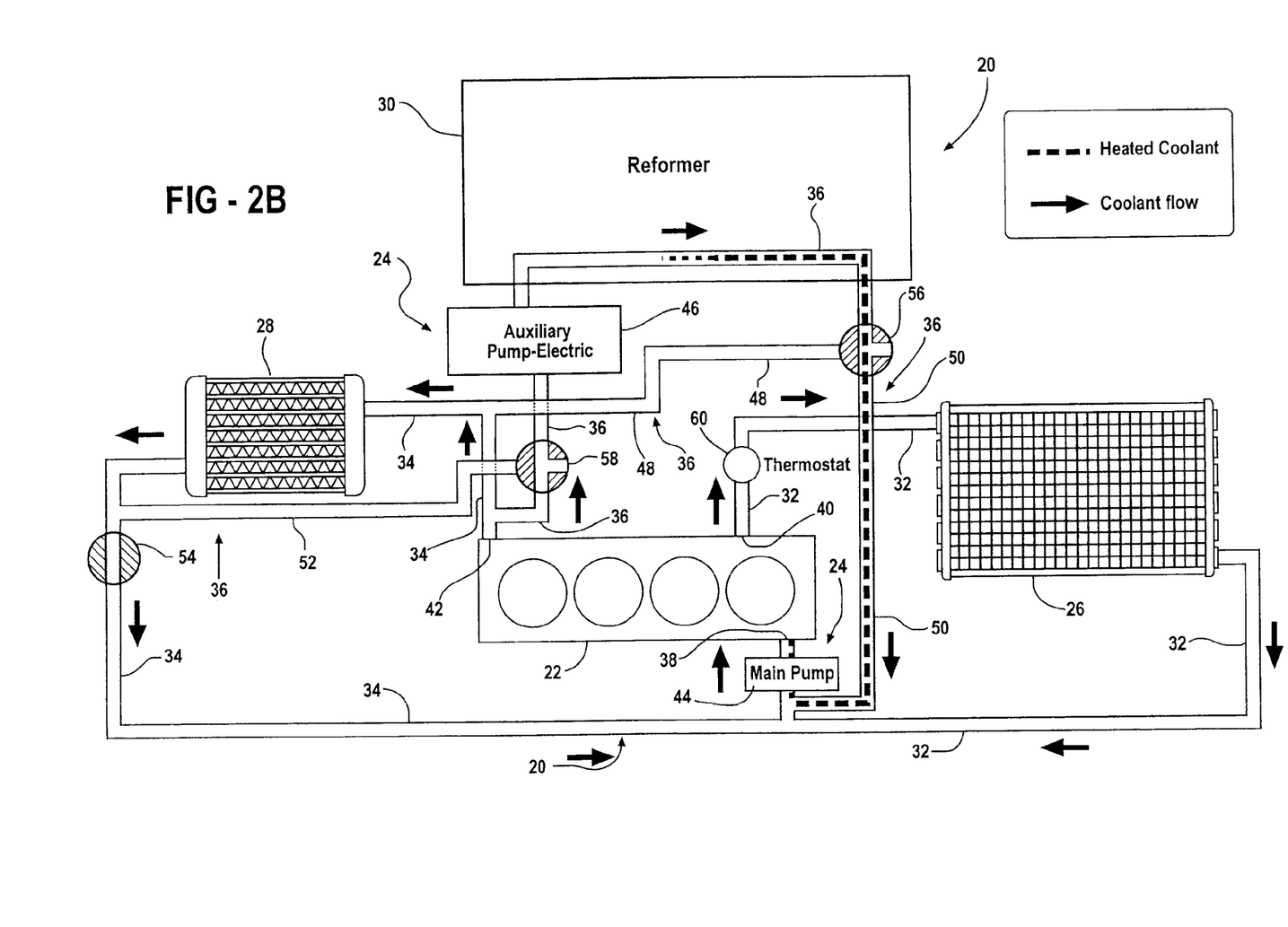
FIG. 2B is a schematic view of the HVAC system disclosed in FIG. 2A illustrating a configuration for providing supplemental heat to an engine of the vehicle.
Figure 2C:
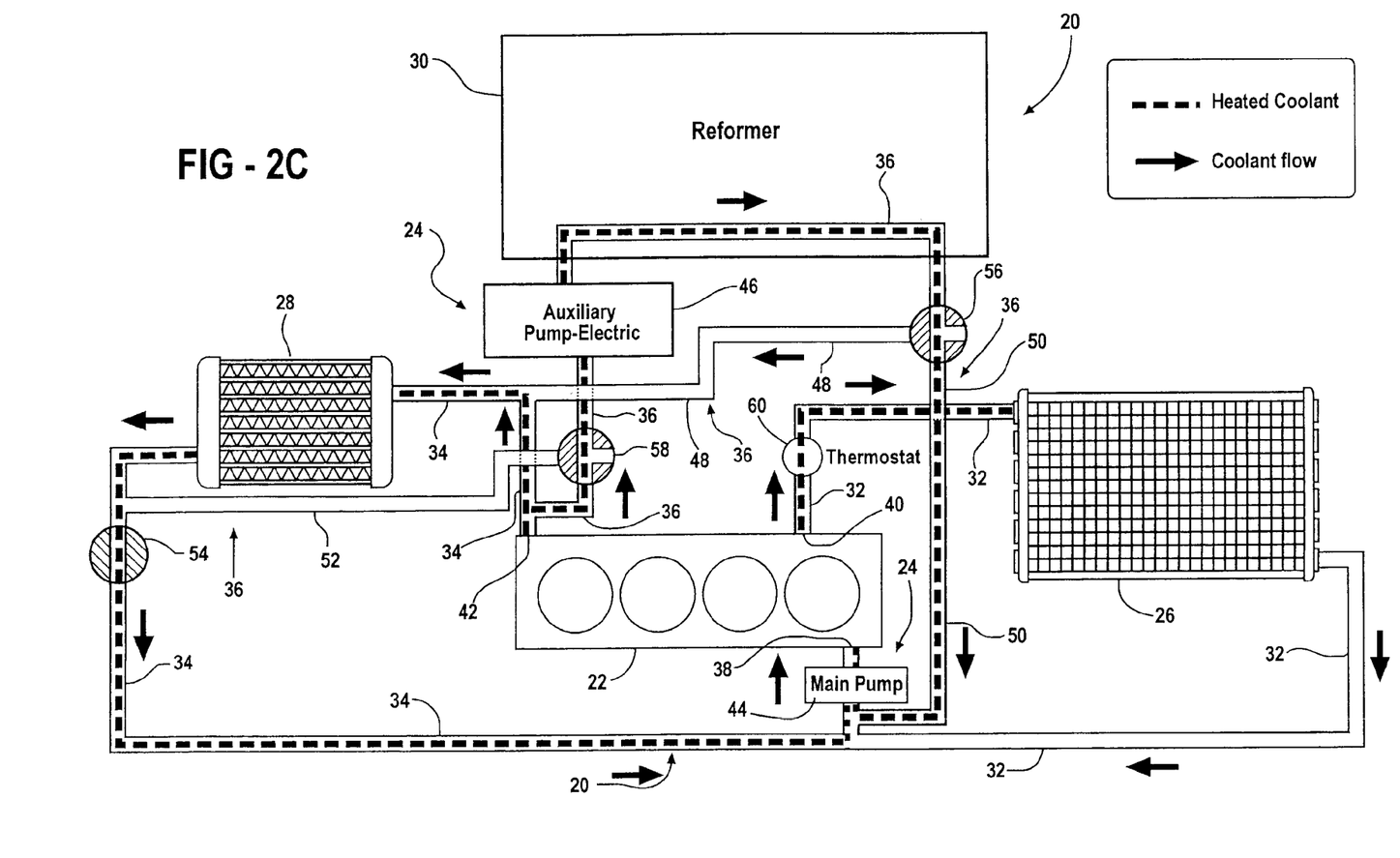
FIG. 2C is a schematic view of the HVAC system disclosed in FIGS. 2A and 2B illustrating a configuration for providing supplemental heat to the engine of the vehicle while cooling the reformer assembly.

Referring specifically to the preferred embodiment disclosed in FIGS. 2A through 2C, the third fluid circuit 36 preferably includes a fluid bypass 52. The fluid bypass 52 interconnects the fluid outlet of the heater core 28 and the fluid inlet of the reformer assembly 30. As such, after circulating through the heater core 28, the fluid can be circulated directly back to the reformer assembly 30, without circulating through the engine 22, to provide the supplemental heat from the reformer assembly 30 to the passenger compartment. Of course, a shut-off valve 54 is disposed in the second fluid circuit 34 after the fluid outlet of the heater core 28 and after the fluid bypass 52 to selectively direct the fluid through the fluid bypass 52 and not through the remainder of the second fluid circuit 34 and then through the engine 22.

The HVAC system 20 further includes a solenoid valve 56 disposed in the third fluid circuit 36. More specifically, the solenoid valve 56 is disposed in the third fluid circuit 36 after the fluid outlet of the reformer assembly 30. The solenoid valve 56 is infinitely operable between a first position and a second position. As such, the solenoid valve 56 is most preferably a pulse width modulation (PWM) solenoid valve.

Figure 3A:
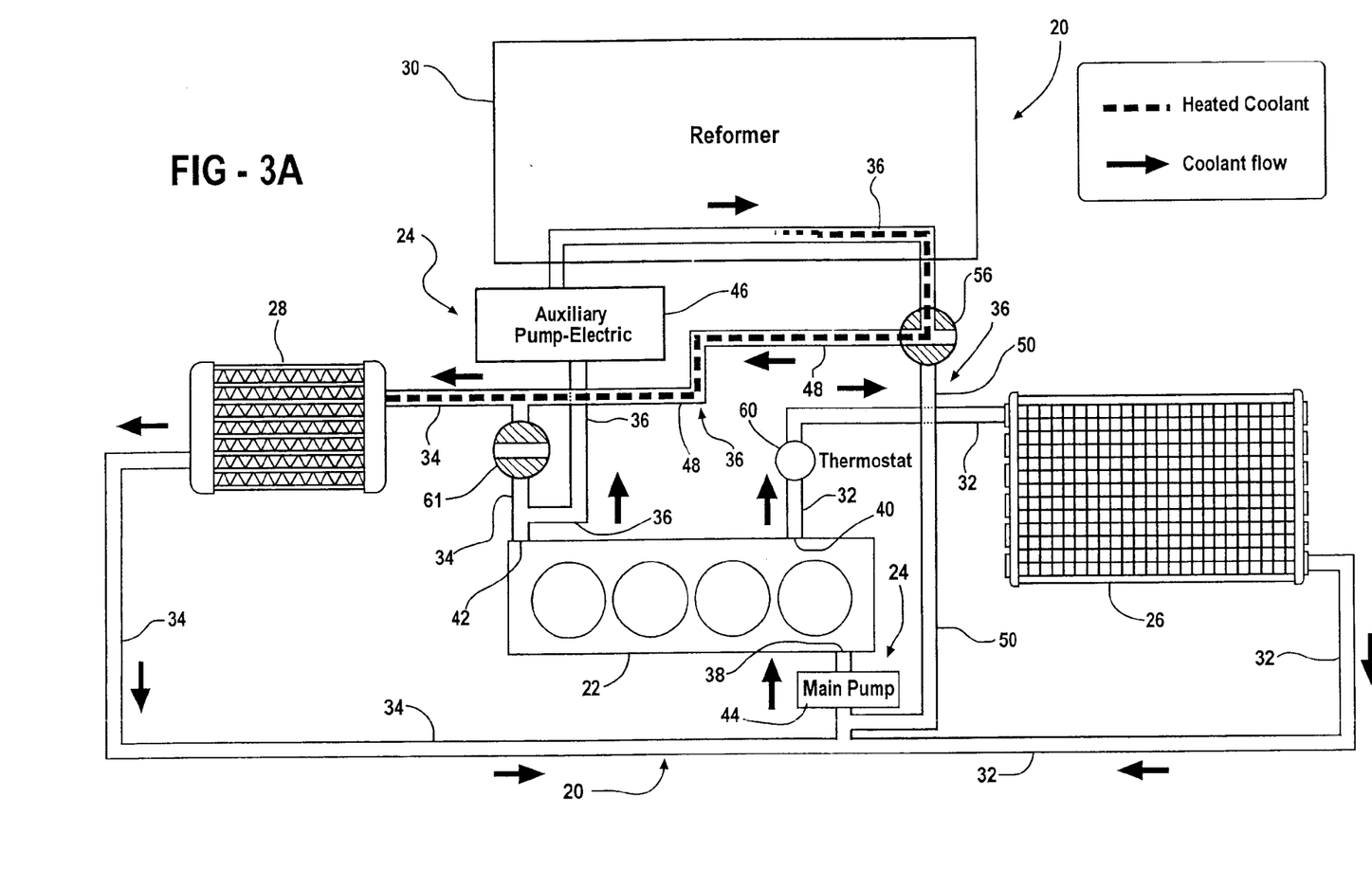
FIG. 3A is a schematic view of an alternative HVAC system of the subject invention including the first heat exchanger, the second heat exchanger, the pump, and the reformer assembly and illustrating a configuration for providing supplemental heat to the passenger compartment of the vehicle.

In the first position of the solenoid valve 56, which is disclosed in FIGS. 2A and 3A, the fluid circulates from the third fluid circuit 36 and through the heater core 28. More specifically, in the first position of the solenoid valve 56, the fluid is circulated through the reformer assembly 30 and directed by the solenoid valve 56 toward the heater core 28 to selectively provide the supplemental heat from the reformer assembly 30 to the passenger compartment through the heater core 28. In the second position of the solenoid valve 56, disclosed in FIGS. 2B, 2C, 3B, 3C, the fluid circulates from the third fluid circuit 36 and through the engine 22. More specifically, in the second position of the solenoid valve 56, the fluid is circulated through the reformer assembly 30 and is directed by the solenoid valve 56 toward the pump inlet for circulation through the engine 22 to selectively provide the supplemental heat from the reformer assembly 30 to the engine 22.

Of course, as described additionally below, the solenoid valve 56, which is infinitely operable between the first and second positions, can selectively control flow of the fluid in both directions at the same time. That is, the solenoid valve 56 can selectively control the flow of the fluid from the reformer assembly 30 and then through the heater core 28, and from the reformer assembly 30 and then through the engine 22.

As described above, the third fluid circuit 36 is interconnected with the heater core 28 so that the supplemental heat from the reformer assembly 30 can be provided to the passenger compartment through the heater core 28. Although not required, it is preferred that the third fluid circuit 36 is interconnected with the heater core 28 through the second fluid circuit 34. That is, prior to circulating through the heater core 28, the fluid circulates from the third fluid circuit 36 into a portion of the second fluid circuit 34, and then into and through the heater core 28.

In order to correspond with the exemplary embodiments, both preferred and alternative, disclosed in FIGS. 2 and 3, the examples set forth below are described as if there are two pumps, the main pump 44 and the auxiliary pump 46. However, as described above, two pumps are not required and the main pump 44 is adequate to circulate the fluid throughout all components of the HVAC system 20, including the first 32, second 34, and third 36 fluid circuits so long as the main pump 44 is electric.

Referring to the preferred embodiment of FIG. 2A, an ultra-fast heating configuration is disclosed for rapidly heating the passenger compartment of the vehicle. This configuration is also referred to as pre-conditioning as the temperature of the passenger compartment is conditioned even though the engine 22 of the vehicle is not operating. In this Figure, the solenoid valve 56 is in the first position, the main pump 44 is off, the auxiliary pump 46 is on, and the reformer assembly 30 has been activated. Accordingly, the auxiliary pump 46 circulates the fluid through the fluid inlet of the reformer assembly 30, through the reformer assembly 30 itself, through the fluid outlet of the reformer assembly 30, through the solenoid valve 56 which is in the first position, through the first fluid return 48 of the third fluid circuit 36, into the second fluid circuit 34, through the fluid inlet of the heater core 28, through the heater core 28 itself, and through the fluid outlet of the heater core 28. With the fluid, which is tempered from the heat generated in the reformer assembly 30, circulating through the heater core 28, the passenger compartment of the vehicle can be heated even though the engine 22 is not operating. Furthermore, in this ultra-fast heating configuration, the shut-off valve 54 is closed such that the fluid from the fluid outlet of the heater core 28 is selectively directed through the fluid bypass 52 and not through the second fluid circuit 34 to the engine 22. In this embodiment, the shut-off valve 54 is disclosed as a two position shut-off valve 54. However, it is to be understood that the two position shut-off valve 54 may be a variable position shut-off valve that can provide for both warming of the engine 22 and the passenger compartment at the same time. That is, some fluid may be directed through both the fluid bypass 52 and through the second fluid circuit 34 to the engine 22. A second solenoid valve 58, which is a two-position valve, is disposed at the second engine fluid outlet 42. The second solenoid valve 58 has two different valve inlets and one valve outlet. In a first position of the second solenoid valve 58, one of the valve inlets is in fluid communication with the fluid bypass 52 (see FIG. 2A), and in a second position of the second solenoid valve 58, the other of the valve inlets is in fluid communication with the second engine fluid outlet 42 (see FIGS. 2B–2C). In the embodiment of FIG. 2A, the second solenoid valve 58 is in the first position, and the fluid circulates from the fluid bypass 52, through the second solenoid valve 58, directly back through the auxiliary pump 46 and into the reformer assembly 30 where the fluid is immediately re-heated.

Referring to the preferred embodiment of FIG. 2B, an engine 22 warm-up configuration is disclosed for heating the engine 22 of the vehicle. In this Figure, the solenoid valve 56 is in the second position, the main pump 44 is on, the auxiliary pump 46 is on, and the reformer assembly 30 has been activated. Accordingly, the auxiliary pump 46 circulates the fluid through the fluid inlet of the reformer assembly 30, through the reformer assembly 30 itself, through the fluid outlet of the reformer assembly 30, through the solenoid valve 56 which is in the second position, through the second fluid return 50 of the third fluid circuit 36, through the main pump 44, through the engine fluid inlet 38, through the engine 22 itself to warm the engine 22, and through the first and second engine fluid outlets 40, 42. The fluid that circulates through the first engine fluid outlet 40 circulates through the first fluid circuit 32 including the radiator 26. On the other hand, the fluid that circulates through the second engine fluid outlet 42 can circulate through the second 34 or third 36 fluid circuit or both 34, 36. In this embodiment, the second solenoid valve 58, which is disposed at the second engine fluid outlet 42, is in the second position. The fluid circulates from the second engine fluid outlet 42 to the second fluid circuit 34 and to the heater core 28. In this embodiment, the shut-off valve 54 is open. As such, the fluid from the heater core 28 circulates through the second fluid circuit 34 back to the main pump 44. Because the second solenoid valve 58 is in the second position, the fluid from the second engine fluid outlet 42 also circulates through the second solenoid valve 58, back through the auxiliary pump 46 and into the reformer assembly 30 where the fluid is reheated for circulation through the engine 22. With the fluid, which is tempered from the heat generated in the reformer assembly 30, circulating through the engine 22, the warm-up of the engine 22 is enhanced. In this embodiment, the main pump 44 can be off provided the auxiliary pump 46 can circulate the fluid as required.

Referring to the preferred embodiment of FIG. 2C, a reformer assembly 30 cooling configuration is disclosed for cooling the reformer assembly 30. In this Figure, the solenoid valve 56 is in the second position, the main pump 44 is on, the auxiliary pump 46 is on, and the reformer assembly 30 has been activated. Accordingly, the auxiliary pump 46 circulates the fluid through the fluid inlet of the reformer assembly 30, through the reformer assembly 30 itself, through the fluid outlet of the reformer assembly 30, through the solenoid valve 56 which is in the second position, through the second fluid return 50 of the third fluid circuit 36, through the main pump 44, through the engine fluid inlet 38, through the engine 22 itself thereby warming the engine 22, and through the first and second engine fluid outlets 40, 42. The fluid that circulates through the first engine fluid outlet 40 circulates through the first fluid circuit 32 including the radiator 26. On the other hand, the fluid that circulates through the second engine fluid outlet 42 can circulate through the second 34 or third 36 fluid circuit, or both. In this embodiment, the second solenoid valve 58, which is disposed at the second engine fluid outlet 42, is in the second position. The fluid circulates from the second engine fluid outlet 42 to the second fluid circuit 34 and to the heater core 28. In this embodiment, the shut-off valve 54 is open. As such, the fluid from the heater core 28 circulates through the second fluid circuit 34 back to the main pump 44. Because the second solenoid valve 58 is in the second position, the fluid from the second engine fluid outlet 42 also circulates through the second solenoid valve 58, back through the auxiliary pump 46 and into the reformer assembly 30 for circulation through the engine 22. With the fluid circulating from the reformer assembly 30 being utilized to heat the passenger compartment, via the heater core 28, and to heat the engine 22, the reformer assembly 30 is cooled at the quickest rate possible.

Figure 3B:
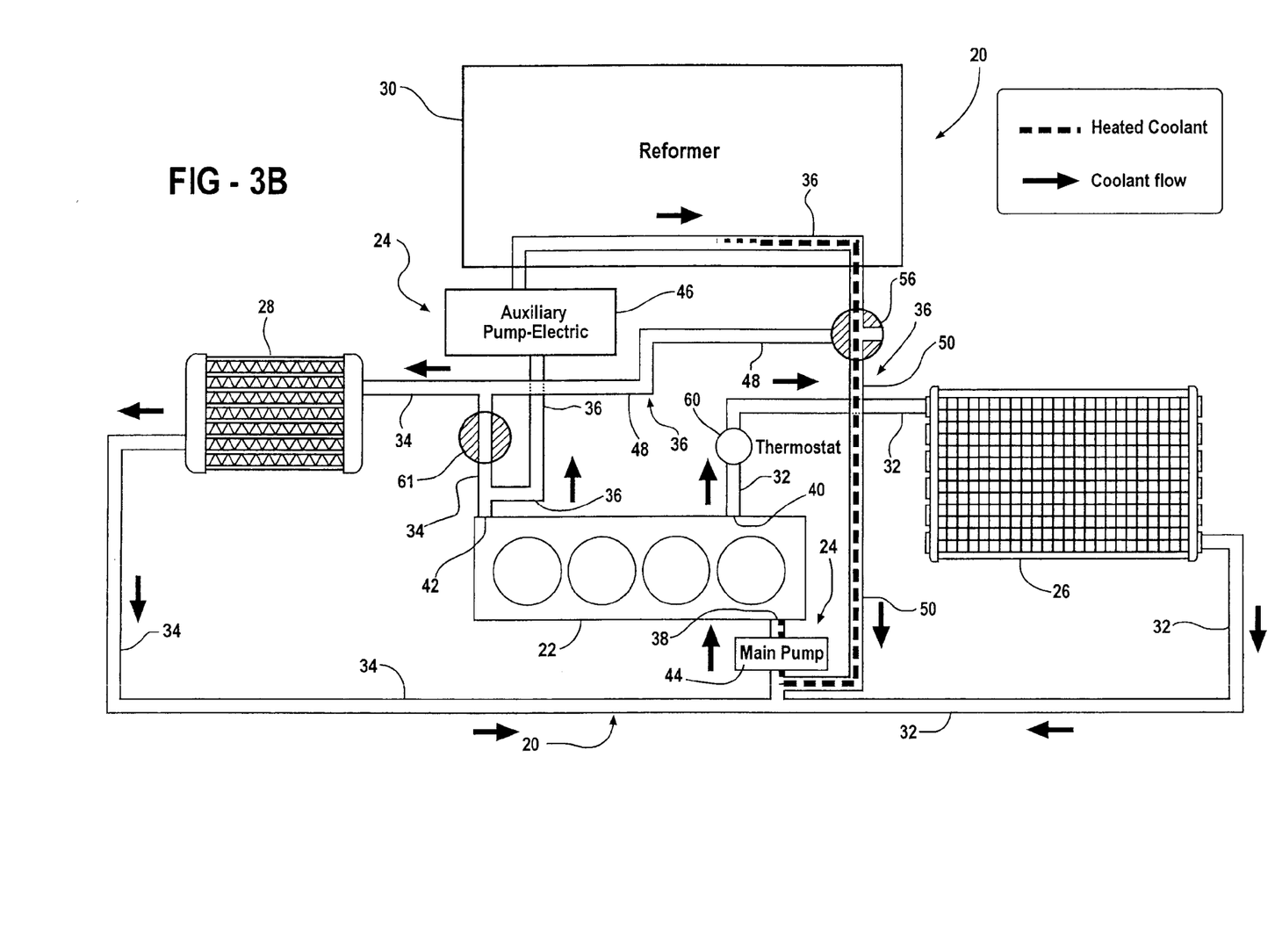
FIG. 3B is a schematic view of the alternative HVAC system disclosed in FIG. 3A illustrating a configuration for providing supplemental heat to the engine of the vehicle.
Figure 3C:
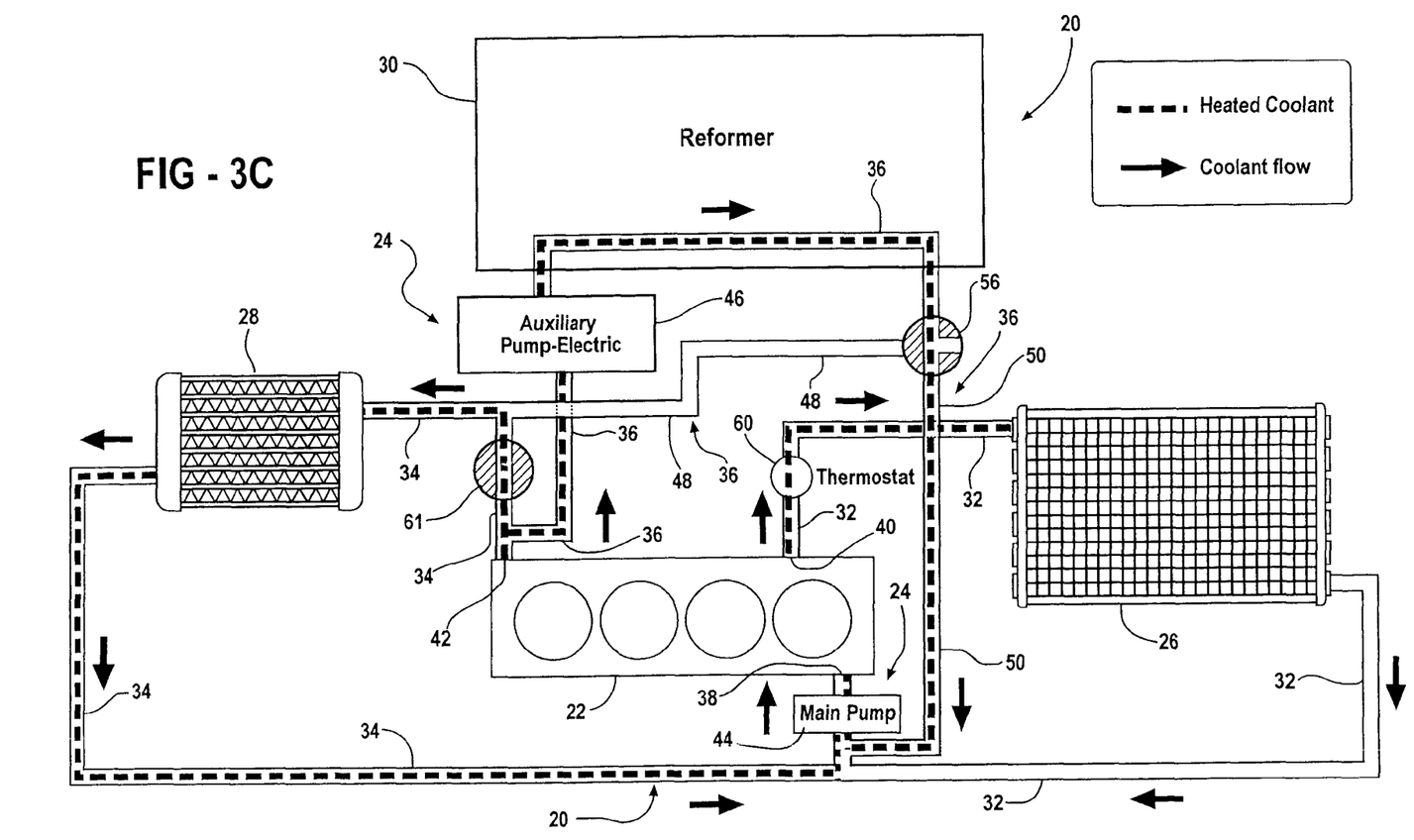
FIG. 3C is a schematic view of the alternative HVAC system disclosed in FIGS. 3A and 3B illustrating a configuration for providing supplemental heat to the engine of the vehicle while cooling the reformer assembly.

In the alternative embodiments of FIGS. 3A–3C, there is no fluid bypass 52. As a result, there is no shut-off valve 54 and a second shut-off valve 61 is added in the second fluid circuit 34. Furthermore, there is no second solenoid valve 58 disposed at the second engine fluid outlet 42.

Referring to the alternative embodiment of FIG. 3A, a rapid heating configuration is disclosed for rapidly heating the passenger compartment of the vehicle. This rapid heating configuration heats the passenger compartment of the vehicle less rapidly than the ultra-fast heating configuration disclosed in FIG. 2A. Like FIG. 2A, the configuration disclosed in FIG. 3A is also referred to as pre-conditioning as the temperature of the passenger compartment is conditioned even though the engine 22 of the vehicle is not operating. In this Figure, the solenoid valve 56 is in the first position, the main pump 44 is off, the auxiliary pump 46 is on, and the reformer assembly 30 has been activated. Also, in this embodiment, the second shut-off valve 61 is in an OFF position to isolate the auxiliary pump 46 such that flow cannot go to the auxiliary pump 46. Accordingly, the auxiliary pump 46 circulates the fluid through the fluid inlet of the reformer assembly 30, through the reformer assembly 30 itself, through the fluid outlet of the reformer assembly 30, through the solenoid valve 56 which is in the first position, through the first fluid return 48 of the third fluid circuit 36, into the second fluid circuit 34, through the fluid inlet of the heater core 28, through the heater core 28 itself, and through the fluid outlet of the heater core 28. With the fluid, which is tempered from the heat generated in the reformer assembly 30, circulating through the heater core 28, the passenger compartment of the vehicle can be heated even though the engine 22 is not operating.

Referring to the alternative embodiment of FIG. 3B, an engine 22 warm-up configuration is disclosed for heating the engine 22 of the vehicle. In this Figure, the solenoid valve 56 is in the second position, the main pump 44 is on, the auxiliary pump 46 is on, and the reformer assembly 30 has been activated. Also, in this embodiment, the second shut-off valve 61 is in an ON position. Accordingly, the auxiliary pump 46 circulates the fluid through the fluid inlet of the reformer assembly 30, through the reformer assembly 30 itself, through the fluid outlet of the reformer assembly 30, through the solenoid valve 56 which is in the second position, through the second fluid return 50 of the third fluid circuit 36, through the main pump 44, through the engine fluid inlet 38, through the engine 22 itself to warm the engine 22, and through the first and second engine fluid outlets 40, 42. The fluid that circulates through the first engine fluid outlet 40 circulates through the first fluid circuit 32 including the radiator 26. On the other hand, the fluid that circulates through the second engine fluid outlet 42 is split at the second engine fluid outlet 42 to circulate to the heater core 28 and to the reformer assembly 30. The fluid circulating to the heater core 28 circulates through the second fluid circuit 34 back to the main pump 44 and through the engine 22. The fluid circulating to the reformer assembly 30 circulates through the third fluid circuit 36, through the reformer assembly 30, back to the main pump 44 and through the engine 22. With the fluid, which is tempered from the heat generated in the reformer assembly 30, circulating through the engine 22, the warm-up of the engine 22 is enhanced.

Referring to the alternative embodiment of FIG. 3C, a reformer assembly 30 cooling configuration is disclosed for cooling the reformer assembly 30. In this Figure, the solenoid valve 56 is in the second position, the main pump 44 is on, the auxiliary pump 46 is on, and the reformer assembly 30 has been activated. Also, in this embodiment, the second shut-off valve 61 is in the ON position. Accordingly, the auxiliary pump 46 circulates the fluid through the fluid inlet of the reformer assembly 30, through the reformer assembly 30 itself, through the fluid outlet of the reformer assembly 30, through the solenoid valve 56 which is in the second position, through the second fluid return 50 of the third fluid circuit 36, through the main pump 44, through the engine fluid inlet 38, through the engine 22 itself thereby warming the engine 22, and through the first and second engine fluid outlets 40, 42. The fluid that circulates through the first engine fluid outlet 40 circulates through the first fluid circuit 32 including the radiator 26. On the other hand, the fluid that circulates through the second engine fluid outlet 42 is split at the second engine fluid outlet 42 to circulate to the heater core 28 and to the reformer assembly 30. The fluid circulating to the heater core 28 circulates through the second fluid circuit 34 back to the main pump 44 and through the engine 22. The fluid circulating to the reformer assembly 30 circulates through the third fluid circuit 36, through the reformer assembly 30, back to the main pump 44 and through the engine 22. With the fluid circulating from the reformer assembly 30 being utilized to heat the passenger compartment, via the heater core 28, and to heat the engine 22, the reformer assembly 30 is cooled at the quickest rate possible.

Figure 4:
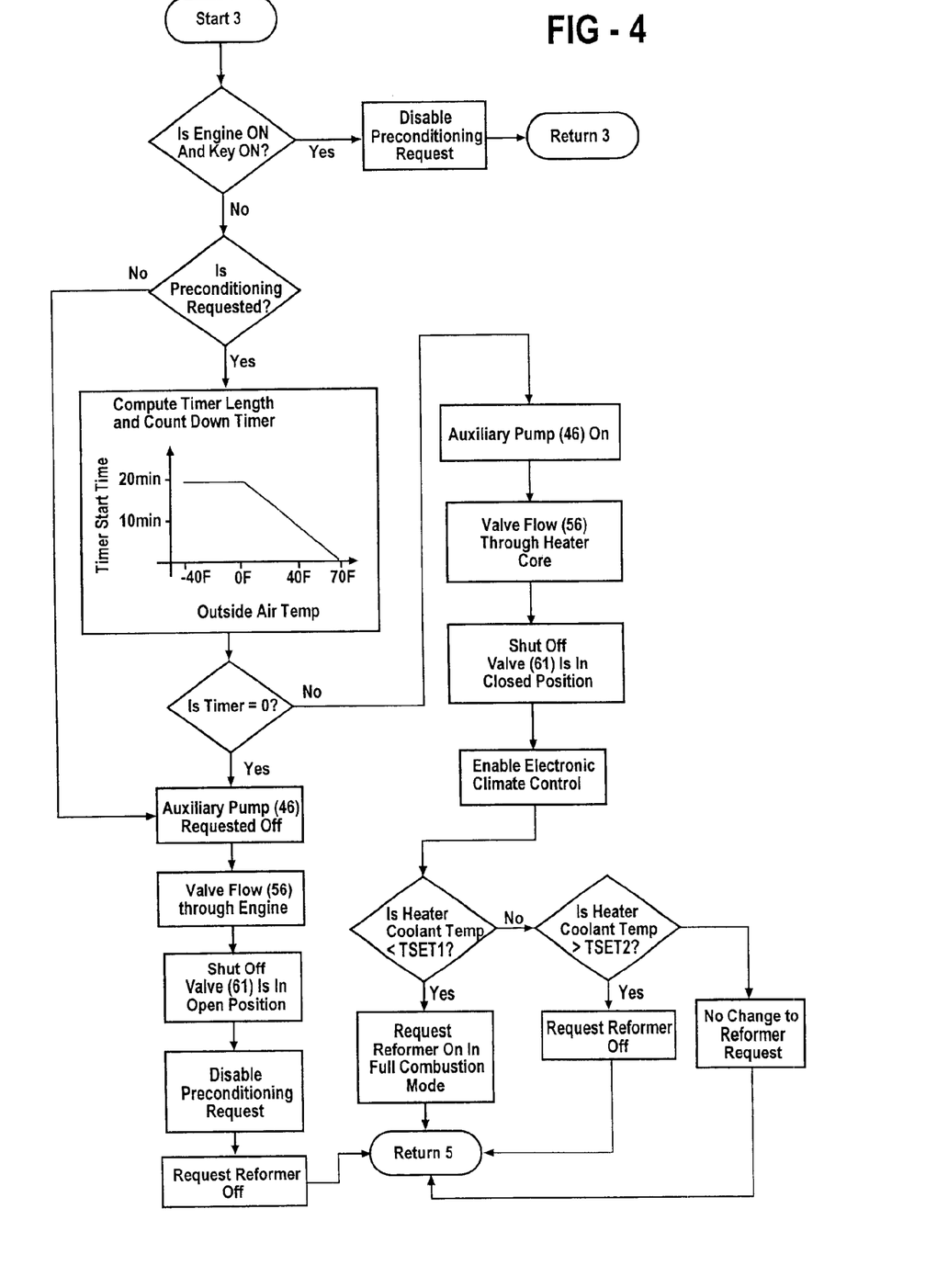
FIG. 4 is a flow diagram illustrating a query sequence for controlling the alternative HVAC system that is associated with the schematic view disclosed in FIG. 3A.
Figure 5A:
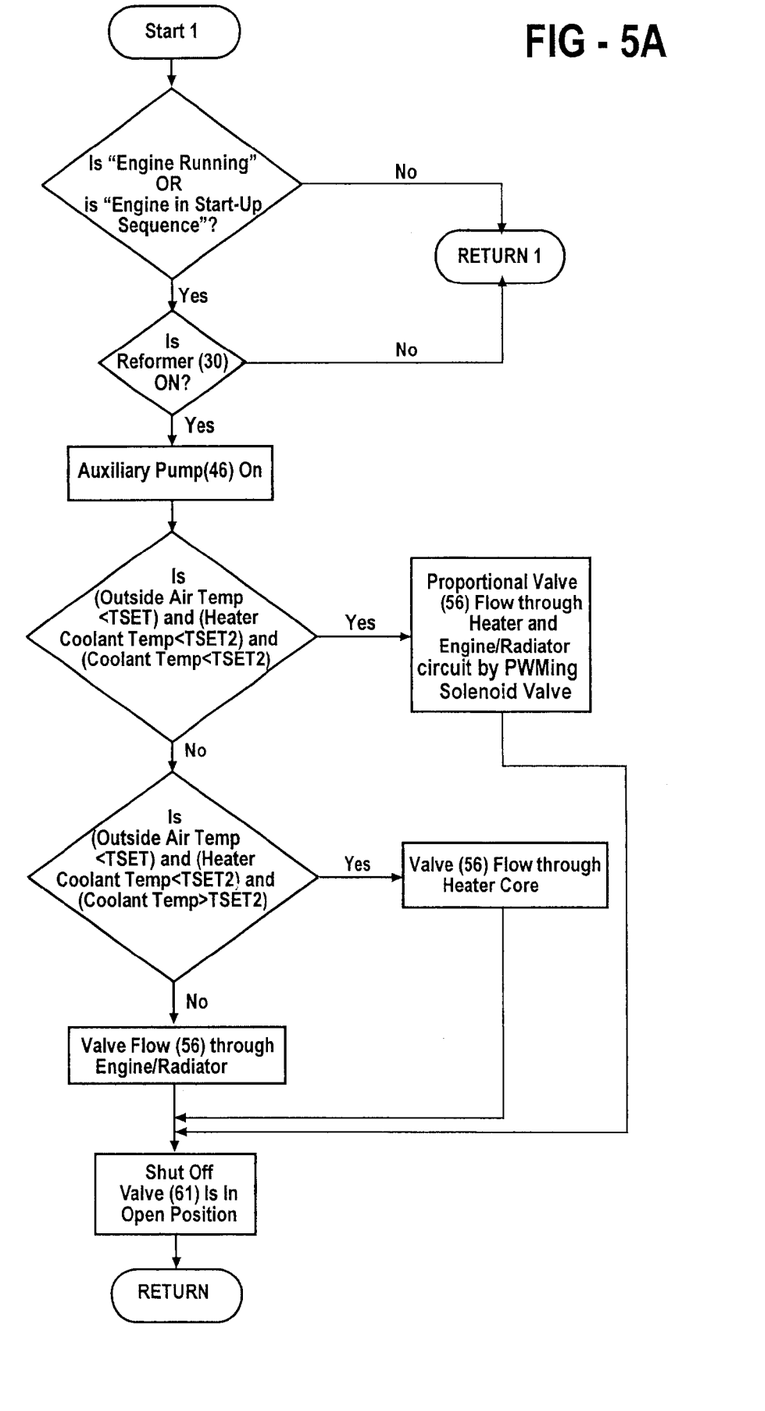
FIG. 5A is a flow diagram illustrating a query sequence for controlling the alternative HVAC system that is associated with FIG. 3B.
Figure 5B:
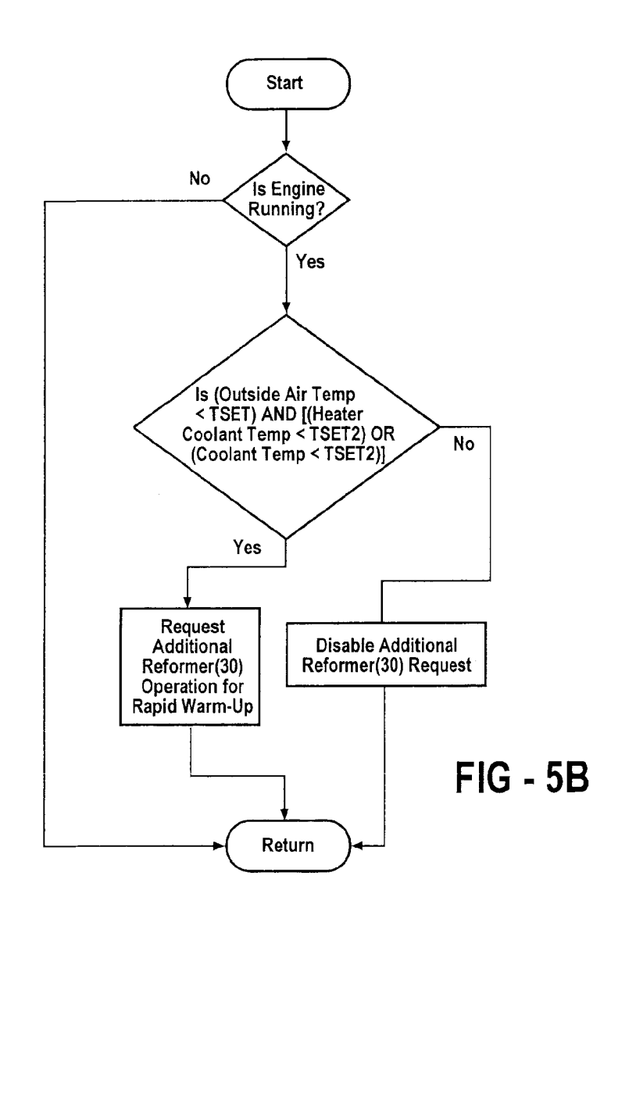
FIG. 5B is a flow diagram illustrating a query sequence for controlling the alternative HVAC system that is associated with FIG. 3B.
Figure 6:
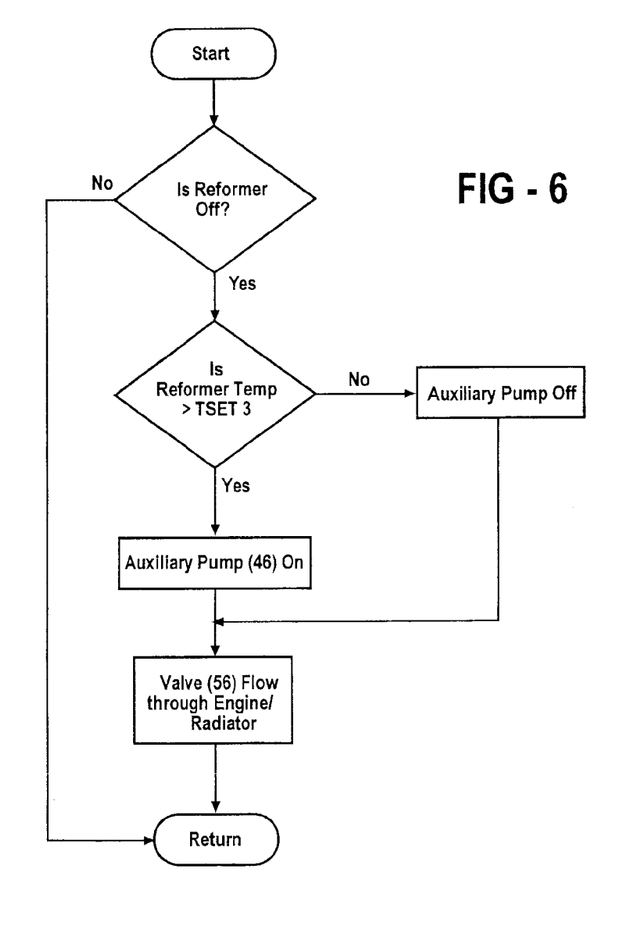
FIG. 6 is a flow diagram illustrating a query sequence for controlling the alternative HVAC system that is associated with FIG. 3C.

The query sequence disclosed in FIG. 4 correlates to the alternative HVAC system 20 as disclosed in FIG. 3A. This query sequence is merely illustrative of one query sequence that is compatible with the HVAC system 20 as arranged in FIG. 3A for rapidly heating the passenger compartment of the vehicle. In particular, this query sequence incorporates a timing sequence that depends on the ambient air temperature. The query sequences disclosed in FIGS. 5A and 5B correlate to the alternative HVAC system 20 as disclosed in FIG. 3B. These query sequences are merely illustrative of query sequences that are compatible with the HVAC system 20 as arranged in FIG. 3B for heating the engine 22 of the vehicle. The query sequence disclosed in FIG. 6 correlates to the alternative HVAC system 20 as disclosed in FIG. 3C. This query sequence is merely illustrative of one query sequence that is compatible with the HVAC system 20 as arranged in FIG. 3C for cooling the reformer assembly 30. For the query sequences disclosed in FIGS. 4–6, TSET is typically equal to 65° F., TSET1 is typically equal to 170° F., TSET2 is typically equal to 190° F., and TSET3 is typically equal to 130° F. It is to be understood that, although not disclosed herein, a person of ordinary skill in the art could develop similar query sequences that correlate to the preferred HVAC system 20 as disclosed in FIGS. 2A–2C.

It is to be understood that all of the fluid circuits 32, 34, 36 disclosed in FIGS. 2A–3C may be routed and connected differently, as would be understood by a person of ordinary skill in the art, and still fall within the scope of the claimed invention. Further, it is to be understood that additional components, which are typically utilized in HVAC systems 20 including, but not limited to, fans, temperature sensors, and a thermostat 60, are not described herein because such components are not critical to the purposes of the subject invention.

Figure 7:
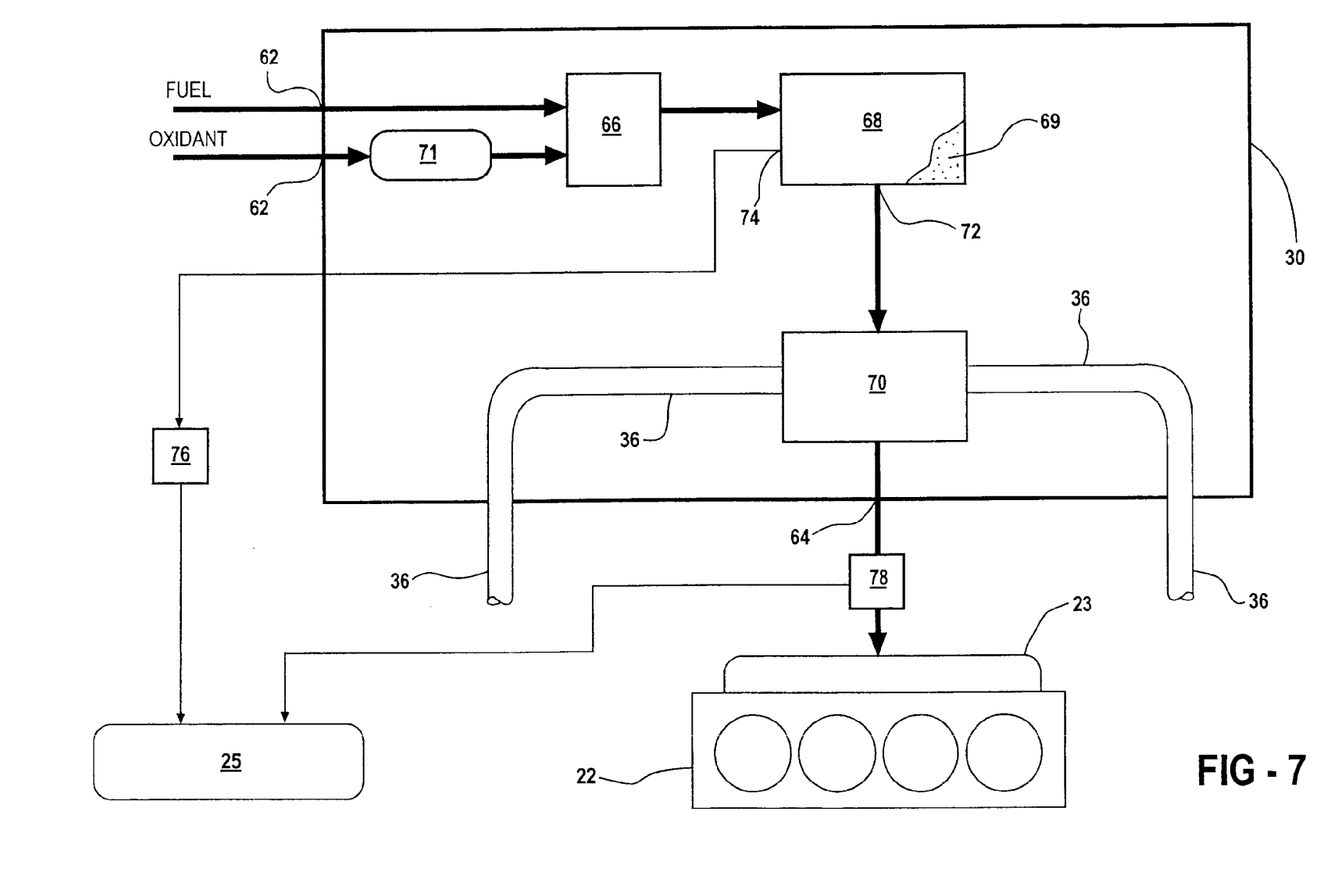
FIG. 7 is a schematic view of the reformer assembly relative to an intake manifold and a catalytic converter of the vehicle.

The reformer assembly 30 of the HVAC system 20 provides supplemental heat in the vehicle. Referring particularly to FIG. 7, the reformer assembly 30 is in fluid communication with the intake manifold 23 and the catalytic converter 25. The reformer assembly 30 includes a reformer inlet 62 and a reformer outlet 64. The reformer inlet 62 and the reformer outlet 64 are represented schematically in FIG. 7. The reformer inlet 62 receives the fuel and the oxidant.

The reformer outlet 64 is described below. The reformer assembly 30 also includes a first chamber 66. The first chamber 66 is in fluid communication with the reformer inlet 62. As such, the first chamber 66 receives the fuel and the oxidant and mixes and vaporizes the fuel and the oxidant.

The reformer assembly 30 also includes a second chamber 68. The second chamber 68 is in fluid communication with the first chamber 66. The second chamber 68 includes a reformer catalyst 69. The reformer catalyst is represented schematically in FIG. 7. The second chamber 68 also typically includes a combustor, not disclosed in the Figure. The reformer catalyst 69 included in the second chamber 68 converts the vaporized fuel and oxidant mixture received from the first chamber 66 into the hydrogen-containing reformate described above. Ultimately, the reformate is distributed to the intake manifold 23 to run the engine 22. As initially described above, heat is generated in the reformer assembly 30, specifically in the second chamber 68 of the reformer assembly 30, during the conversion to form the reformate.

The reformer assembly 30 further includes a gas-to-liquid heat exchanger 70. The gas-to-liquid heat exchanger 70 is in fluid communication with the second chamber 68. As such, the gas-to-liquid heat exchanger 70 receives the reformate prior to distribution of the reformate to the intake manifold 23. Optionally, the reformer assembly 30 may include a blower 71 disposed between the reformer inlet 62 and the first chamber 66 to assist in distributing the reformate. The gas-to-liquid heat exchanger 70 also functions to cool the reformate going to the engine 22. The reformer outlet 64 is in fluid communication with the gas-to-liquid heat exchanger 70 and with the intake manifold 23 for distributing the reformate to the intake manifold 23 to run the engine 22.

A fluid circuit, specifically the third fluid circuit 36, is thermodynamically coupled with the gas-to-liquid heat exchanger 70 such that the heat that is generated in the second chamber 68 during the conversion is transferred to the fluid. With this heat transferred to the fluid, supplemental heat can be provided to the vehicle because the third fluid circuit 36, similar to the first and second fluid circuits 32, 34, distributes the fluid throughout the HVAC system 20 of the vehicle.

As disclosed in FIG. 7, the second chamber 68 includes a first fluid outlet 72 and a second fluid outlet 74. The first fluid outlet 72 is in fluid communication with the gas-to-liquid heat exchanger 70 for distributing the reformate to the gas-to-liquid heat exchanger 70. The second fluid outlet 74 is in fluid communication with the catalytic converter 25 for distributing the heat generated in the second chamber 68 to the catalytic converter 25. More specifically, a first control valve 76 is disposed in the second fluid outlet 74 for selectively controlling the distribution of heat to the catalytic converter 25 through the second fluid outlet 74. It is to be understood that the first control valve 76 and the second fluid outlet 74 are optional.

In addition to the gas-to-liquid heat exchanger 70 and the intake manifold 23, the reformer outlet 64 is also in fluid communication with the catalytic converter 25. As such, the reformate can be distributed to the catalytic converter 25 if desired. More specifically, a second control valve 78 is disposed adjacent the reformer outlet 64 for selectively controlling the distribution of the reformate to the intake manifold 23 and the catalytic converter 25. The second control valve 78 is specifically disposed in a fluid line extending between the reformer outlet 64, the intake manifold 23, and the catalytic converter 25. The second control valve 78 is variable such that it can control flow to the only the intake manifold 23 (and not to the catalytic converter 25), such that it can control flow to only the catalytic converter 25 (and not to the intake manifold 23), and such that it can control flow to both the intake manifold 23 and the catalytic converter 25 at the same time. For clarity purposes in FIG. 7, it is to be understood that the blower 71, the first chamber 66, the second chamber 68, and the gas-to-liquid heat exchanger 70 are represented schematically. This schematic representation is not to be limiting in any manner relative to these components.

In the pre-conditioning mode of operation i.e., where the engine is off, as disclosed in FIGS. 2A and 3A, the first control valve 76 is closed and the second control valve 78 is closed to the intake manifold 23 and open to the catalytic converter 25. As a result, a maximum amount of the heat that is generated in the reformer assembly 30 is transferred to the fluid in the third fluid circuit 36, via the gas-to-liquid heat exchanger 70, for supplementally heating the vehicle. Ultimately, this fluid is transferred to the heater core 28 to heat the passenger compartment.

As would be understood by those skilled in the art, the position of the first and second control valves 76, 78 can be sequenced in different manners depending on what condition of operation for the vehicle is desired. For example, if a low emission start-up of the vehicle is desired and supplemental heating is also desired, the first control valve 76 is open such that heat is provided to the catalytic converter 25. Then, once the engine is cranked and started, the second control valve 78 is positioned to control the flow of the reformate into the engine for lean, low emission start-up, and the first control valve 76 is closed such that the catalytic converter 25 is isolated. As another non-limiting example, if both supplemental heating and lower $NO_x$ combustion are desired, then the second control valve 78 is positioned such that all of the reformate is distributed to the engine 22. This increases the warm-up rate of the engine 22 thereby increasing the efficiency of the engine 22 and lowering $NO_x$ emissions.

Overall, the reformer assembly 30 is a fast start-up reformer that functions to precondition the vehicle by accelerating warm-up of the engine 22 and the passenger compartment of the vehicle. Indirectly, the reformer assembly 30 utilized in the subject invention also functions to accelerate warm-up of catalyst in the catalytic converter, i.e., exhaust catalyst and to reduce emissions of the engine 22.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A reformer assembly for providing supplemental heat in a vehicle having an engine with an intake manifold, a catalytic converter, and an HVAC system, wherein said reformer assembly is in fluid communication with the intake manifold and the catalytic converter and comprises:

a reformer inlet for receiving a fuel and an oxidant;

a first chamber in fluid communication with said reformer inlet for mixing and vaporizing the fuel and the oxidant;

a second chamber in fluid communication with said first chamber, said second chamber comprising a reformer catalyst to convert the vaporized fuel and oxidant mixture received from said first chamber into a hydrogen-containing reformate to be distributed to the intake manifold, wherein heat is generated in said second chamber during the conversion;

a gas-to-liquid heat exchanger in fluid communication with said second chamber for receiving the reformate and for cooling the reformate prior to distribution of the reformate to the intake manifold;

a reformer outlet in fluid communication with said gas-to-liquid heat exchanger and with the intake manifold for distributing the reformate to the intake manifold; and a fluid circuit for distributing a fluid throughout the HVAC system of the vehicle, said fluid circuit being thermodynamically coupled with said gas-to-liquid heat exchanger such that the heat generated in said second chamber during the conversion is transferred to the fluid to provide the supplemental heat to the vehicle.

2. A reformer assembly as set forth in claim 1 wherein said second chamber comprises a first fluid outlet and a second fluid outlet wherein said first fluid outlet is in fluid communication with said gas-to-liquid heat exchanger for distributing the reformate to said gas-to-liquid heat exchanger and said second fluid outlet is in fluid communication with the catalytic converter for distributing the heat generated in said second chamber to the catalytic converter.

3. A reformer assembly as set forth in claim 2 further comprising a first control valve disposed in said second fluid outlet for selectively controlling the distribution of heat to the catalytic converter.

4. A reformer assembly as set forth in claim 3 wherein said reformer outlet is also in fluid communication with the catalytic converter for distributing the reformate to the catalytic converter.

5. A reformer assembly as set forth in claim 4 further comprising a second control valve disposed adjacent said reformer outlet for selectively controlling the distribution of the reformate to the intake manifold and the catalytic converter.

6. A reformer assembly as set forth in claim 5 further comprising a blower disposed between said reformer inlet and said first chamber to assist in distributing the reformate.

7. A reformer assembly as set forth in claim 1 further comprising a blower disposed between said reformer inlet and said first chamber to assist in distributing the reformate.

8. A reformer assembly as set forth in claim 1 wherein said reformer outlet is also in fluid communication with the catalytic converter for distributing the reformate to the catalytic converter.

9. A reformer assembly as set forth in claim 9 further comprising a second control valve disposed adjacent said reformer outlet for selectively controlling the distribution of the reformate to the intake manifold and the catalytic converter.

* * * * *